(No Model.)  7 Sheets—Sheet 3.

V. H. EVERSON & R. J. GOOD.
PLATE PRINTING PRESS.

No. 563,758.  Patented July 14, 1896.

WITNESSES:
Fred White
C. K. Fraser.

INVENTORS:
Valentine H. Everson
Robert J. Good,
By their Attorneys,
Arthur C. Fraser & Co.

(No Model.) 7 Sheets—Sheet 4.

V. H. EVERSON & R. J. GOOD.
PLATE PRINTING PRESS.

No. 563,758. Patented July 14, 1896.

FIG. 4.

WITNESSES:
Fred White
C. K. Fraser.

INVENTORS:
Valentine H. Everson and
Robert J. Good,
By their Attorneys,
Arthur C. Fraser & Co.

(No Model.) 7 Sheets—Sheet 5.

V. H. EVERSON & R. J. GOOD.
PLATE PRINTING PRESS.

No. 563,758. Patented July 14, 1896.

WITNESSES:
Fred White
C. K. Fraser

INVENTORS:
Valentine H. Everson and
Robert J. Good,
By their Attorneys,
Arthur C. Fraser & Co.

(No Model.) 7 Sheets—Sheet 7.

V. H. EVERSON & R. J. GOOD.
PLATE PRINTING PRESS.

No. 563,758. Patented July 14, 1896.

WITNESSES:
Fred White
C. K. Fraser.

INVENTORS:
Valentine H. Everson
Robert J. Good,

By their Attorneys,
Arthur C. Fraser & Co.

UNITED STATES PATENT OFFICE.

VALENTINE H. EVERSON, OF FLATBUSH, AND ROBERT J. GOOD, OF BROOKLYN, NEW YORK; SAID GOOD ASSIGNOR TO SAID EVERSON.

PLATE-PRINTING PRESS.

SPECIFICATION forming part of Letters Patent No. 563,758, dated July 14, 1896.

Application filed December 7, 1892. Serial No. 454,385. (No model.)

*To all whom it may concern:*

Be it known that we, VALENTINE H. EVERSON, residing in Flatbush, and ROBERT J. GOOD, residing in Brooklyn, in the county of Kings, State of New York, citizens of the United States, have invented certain new and useful Improvements in Plate-Printing Presses, of which the following is a specification.

This invention relates to machinery for printing from copper or steel plates or other plates or surfaces wherein the lines to be printed in the impression are cut or sunken in the plate. In printing from such plates it is customary to first ink the plate heavily with a thick tenacious ink, which is rubbed into the lines of the plate, then by a wiper to clean the ink off from the surface of the plate, leaving it in the lines, then to polish the surface of the plate, an operation usually performed by the palm of the hand with whiting, then to apply the paper or card to be printed upon, then to pass the plate and paper between impression-rollers whereby heavy pressure is applied to force the paper down into the inked lines and cause it to take up the ink therefrom, and finally to remove the printed sheet or card. In some instances the engraving is done upon the surface of a cylinder instead of upon the surface of a flat plate, and to like effect.

Our invention seeks to provide an improved type of plate-printing press which shall overcome the difficulties heretofore encountered in plate printing by machinery. To this end it provides improvements in the means for inking the plate and in the means for wiping or cleaning the plate. In plate printing by machinery great difficulty has been experienced in effecting the proper wiping and polishing of the plate, and various attempts have been made to provide a suitable and effective wiper. The most important feature of our invention consists of an improved wiper whereby the difficulties heretofore encountered are believed to be removed. In this wiper, in lieu of the stuffed or elastic cushions heretofore employed, we provide a cushion which is characterized by being made of hollow or elastic material and inflated with compressed air to give it the requisite firmness. By this means the cushion is made equally yielding over all parts of its surface, so that in the operation of wiping or cleaning the plate it will bear with equal pressure on all portions of the surface of the plate with which it comes in contact, thereby avoiding any liability that the plate shall be more heavily wiped in one place than another, and enabling an accurate and minute adjustment to be obtained of the pressure exerted in wiping the plate. As the material of this cushion we use, by preference, india-rubber or rubber interlayered with textile fabric. In order that continual fresh and clean surfaces may be presented by the wiper to the plate, we construct the wiper as an endless traveling cushion by making it in the form of a tubular belt or endless rubber tube distended by inflation. To properly support it and bring it to its work, we carry it over suitable pulleys, means being provided for turning these pulleys continuously or intermittently to cause the endless belt or cushion to advance and thereby present clean surfaces against the plate. To adjust the degree of pressure exerted against the plate in wiping, we may either inflate the tubular belt or cushion with air under greater or less compression, or, preferably, we effect an adjustment of the belt-carrying pulley by which the wiper-belt is presented to the plate, in order to press it more or less firmly against the plate.

In order to clean the wiper-belt and free it from the ink which it takes from the plate, we arrange means for cleansing which act upon the portion of the belt remote from the plate, in order that after being cleansed it shall have time, in traveling thence to the point where it serves to wipe the plate, to become thoroughly dried. By preference we carry the wiper-belt through a bath of some suitable substance having a solvent action upon the ink, by which the latter is dissolved or softened, after which the belt is drawn between scrapers, in order to scrape from it the ink and solvent which remain adhering to it after this treatment.

In order to present the plate most effectively to the wiper, we mount it upon a table carried by the reciprocating bed of the press, which table is caused to rotate during the time that it is passing beneath the wiper, thus moving the surface of the plate against the wiper. After passing beyond the wiper, the table ceases to rotate and becomes stationary in order to admit of placing the sheet to be printed upon the plate. The table continues non-rotative while the bed advances to carry the plate between the pressure-rolls by which the impression is made.

For applying ink to the plate, we provide an improved construction of inking-rollers adapted to ink the plate while it is rotating. To this end, the rollers which apply ink to the plate are made conical, the apex of the cone being directed toward the center of the revolving plate, though not necessarily coinciding therewith.

Referring now to the accompanying drawings, we will proceed to describe our improved machine in detail.

In the machine shown the steel, copper, or other engraved printing plate A is fastened on a revolving table B, which in turn is mounted on a sliding bed C, mounted to reciprocate in guideways $e\,e$, formed in or on the main frame of the machine. This frame is lettered D, and consists of two opposite side frames suitably tied together. Suitable mechanism is provided for reciprocating the bed C between the opposite extreme positions shown in Figs. 4 and 5, imparting to it and the table B the relative movements hereinafter described.

E E' are the impression-rollers, which are mounted to embrace the bed, table, and plate between them and exert a sufficient pressure to produce the impression. These rollers have their journals mounted in bearings in the side frames in the usual manner, and are provided with any usual device for adjusting the pressure with which they clamp the plate in order to regulate the impression.

Figures 7, 8:
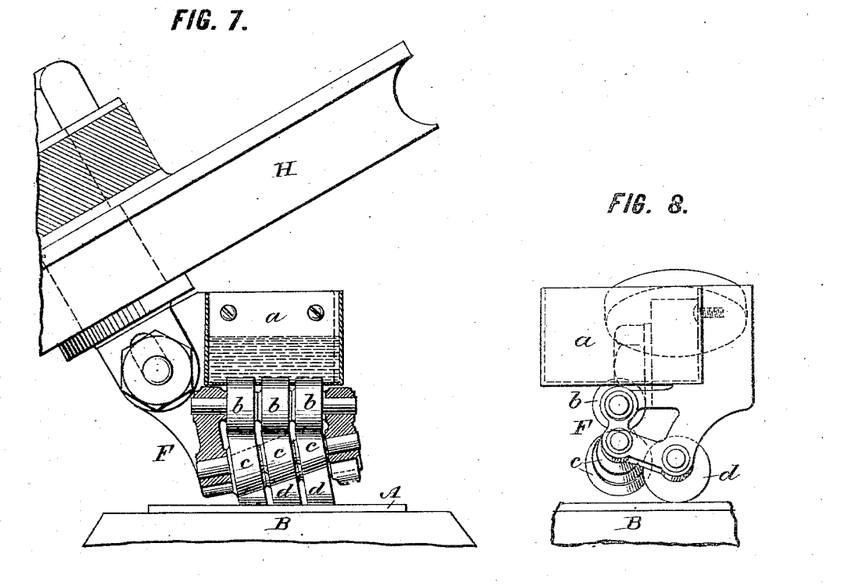
Fig. 7 is an enlarged sectional elevation showing the inking apparatus in detail.
Fig. 8 is an elevation thereof, looking from the middle of the machine.

The inking device, which as a whole is lettered F, consists of an ink-reservoir $a$, having slots or openings in its bottom, in which turn doctor-rolls $b\,b$ of any suitable number, and against these turn conical rollers $c\,c$, which take the ink from the doctor-rolls $b$ and deliver it to and distribute it upon the inking-rolls $d\,d$, which also are conical. The rolls $d\,d$ should be made of suitable yielding material, as should also be the rolls $c\,c$. The rolls $d\,d$ constitute segments of a single conical roller, the apex of the cone being directed toward the center of the revolving table B. As the table carrying the plate passes under the inking-rollers it is revolving, and encounters first the smallest section of these rollers, or that nearest the apex of the cone, passing under the others in succession with a movement that is the product of the longitudinal reciprocation of the bed and the rotation of the table upon it. The rollers $d\,d$ consequently roll over the table in epicycloidal curves and each in a different path from the others, so that the tenacious ink is thoroughly smeared over the plate and worked into the lines thereof. The purpose of the subdivision of the inking-roller into three sections, more or less, instead of employing a single conical roller, is to reduce the strain upon the yielding composition of the roller, which would otherwise result by reason of the differential speed of travel of the different parts of the plate with which different parts of the roller are in contact at the same time, and which would tend to turn one part of the conical roller at a more rapid axial speed than another. By subdividing the roller into sections its several sections may travel at different speeds, which may vary according to the speed of the plate upon which they are rolling. The number of sections into which the inking-roller will be subdivided with each particular kind and size of press will be found by experiment depending upon the relative speeds of reciprocation and rotation, and upon other circumstances. The inking-roller sections $d\,d$ are revolved by contact with the rotating plate, and in turn transmit rotation to the distributing-rollers $c\,c$, which in turn drive the doctor-rollers $b\,b$, by which the ink is taken from the reservoir.

The plate while revolving is carried by the reciprocatory movement of the bed first under the inking-rollers and then back again, during which movements it has received the ink. Continuing its rotation, the reciprocation of the bed carries it under the wiper G, by which the surplus ink is wiped off from the surface of the plate. This wiper consists of an inflated elastic cushion, and may be either stationary or movable. If stationary, the rotation of the plate against it causes it to wipe the plate, but as in this case the wiper would soon become smeared and soiled with ink taken from the plate, and hence inoperative to further clean the plate, we prefer to make the wiper movable, causing it to travel in a contrary direction to the plate. To this end it is made as an elongated inflated cushion, which is kept to its work and given its advancing movement by being carried over suitable pulleys. We make the wiper of an endless tube of india-rubber, or of india-rubber interlayered with suitable woven fabric, this tube being distended by inflating it with air compressed to such pressure as to give the requisite firmness to the tube to enable it best to perform its functions as a wiper. Preferably the tube is inflated to the requisite extent and then sealed. It becomes thus an endless tubular inflated belt, which can be carried over pulleys in the same manner as any round belt or driving-rope used in machinery. In the construction shown it is carried over the wiper-pulley H, turning on a stud H' over guide-pulleys I I', mounted on a shaft K', and drawn thence downward and carried under a pulley J, turning on a stud J'. The pulley I is driven by power either continuously or intermittently, and thereby serves to drive the endless wiper-belt G.

The wiper-pulley H, being the one by which the wiper is held while acting against the plate, is arranged at an angle as shown, its pivotal stud H' being mounted on a swing frame K, hung on the shaft K', which shaft has oscillatory bearings in the machine-frame. One arm K² of this shaft extends down on one side of the machine and is engaged by an adjusting-screw K³, by which the frame may be swung in either direction, so as therewith to raise and lower the wiper-pulley and press the wiper more or less firmly down upon the plate. By this means the firmness with which the wiper bears upon the plate may be adjusted to a nicety.

Figure 6:
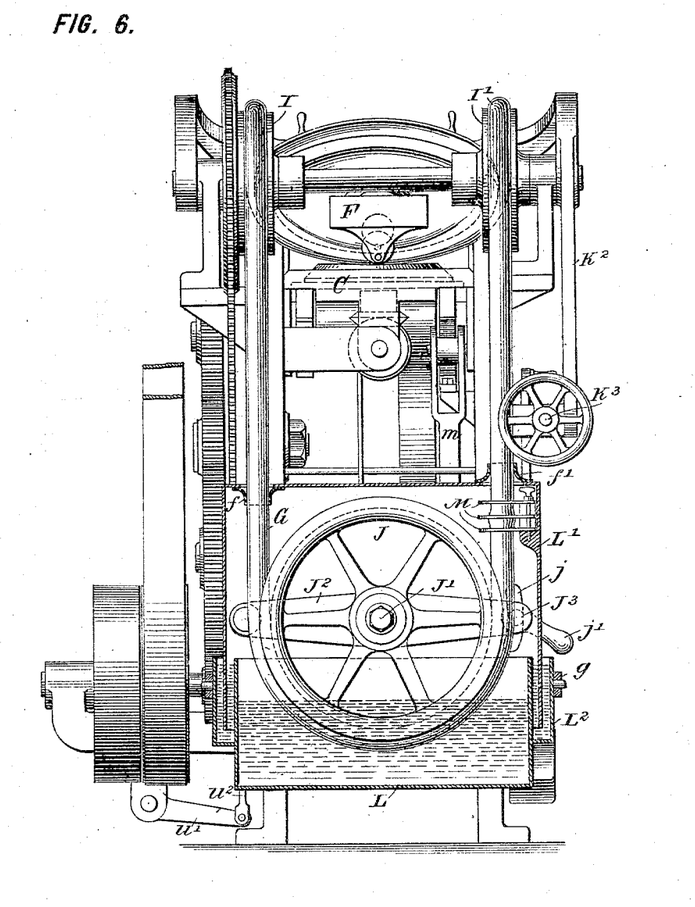
Fig. 6 is an elevation of the opposite end of the machine from Fig. 3, being partly in vertical section on the line 6 6 in Fig. 4.

In order to clean the ink from the wiper-belt G, we carry this belt through a bath of solvent contained in a tank L, shown best in Fig. 6, the pulley J being arranged to partly dip into the solvent in order to carry the wiper-belt into and out of the bath. In order to prevent evaporation of the solvent, as well as to prevent loss by spattering, we inclose the pulley J in a chamber or trunk L', mounted fixedly on the framework. The belt enters this chamber through a stuffing-box or rubber f and emerges from it through a stuffing-box or rubber f', Fig. 6. These stuffing-boxes may readily be constructed of tubular nipples of soft india-rubber. Having a contractile tendency, they cling closely to the wiper-belt, so that the rubber f' serves to rub or wipe off any portion of the solvent that may be carried up by the belt.

Figures 3, 11, 12:
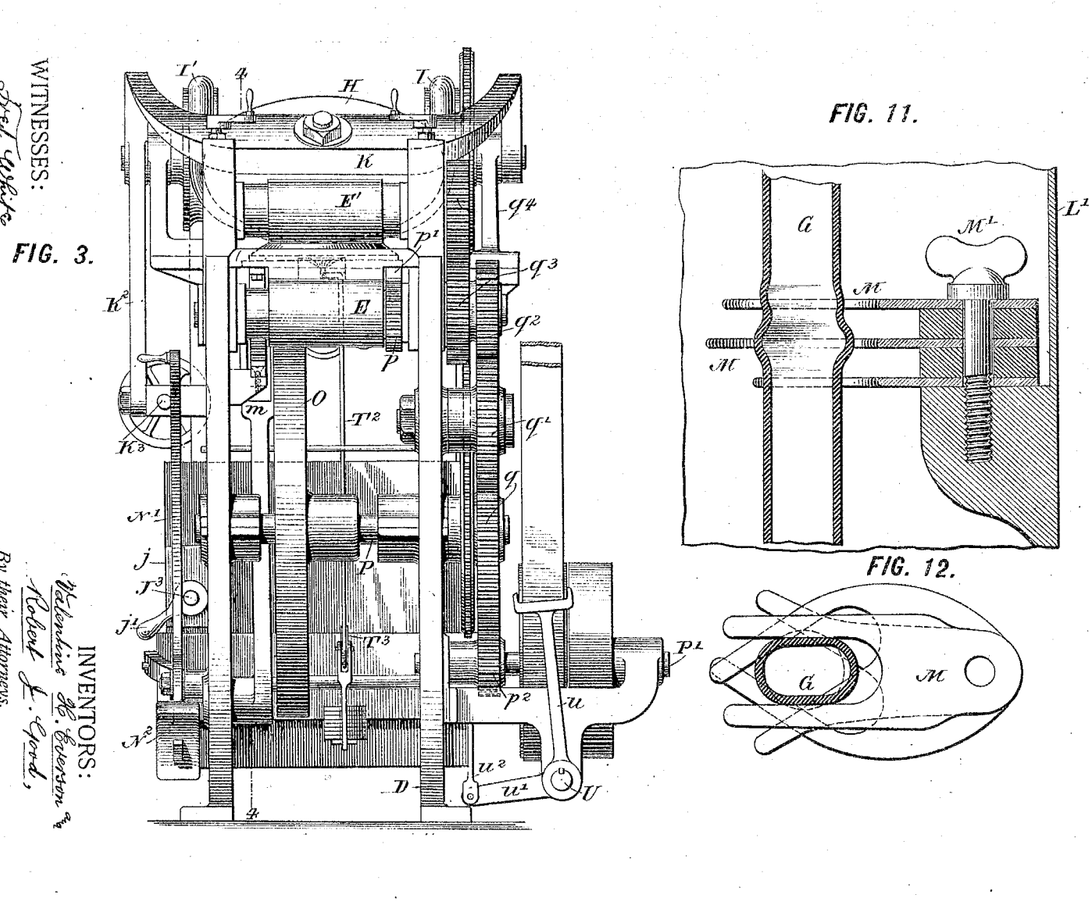
Fig. 3 is an end elevation thereof, looking from beyond the delivery end of the press.
Fig. 11 is a fragmentary enlarged detail section of the scrapers shown in Fig. 6.
Fig. 12 is a plan of the scrapers on the same scale as Fig. 11.

In order to scrape off the undissolved ink from the belt, we provide a series of scrapers M, shown in detail in Figs. 11 and 12. These scrapers consist each of a fork having a slot or opening somewhat narrower than the belt, so that the belt in passing through it will be compressed or flattened. The slot or opening in each of the scraper-plates has a rounded edge designed to scrape the belt without cutting or abrading it. The slots in the three scrapers are set in different positions, as shown in Fig. 12, in order to scrape different portions of the surface of the belt. The scrapers are fastened in place by a screw M' or by other convenient means.

Figure 1:
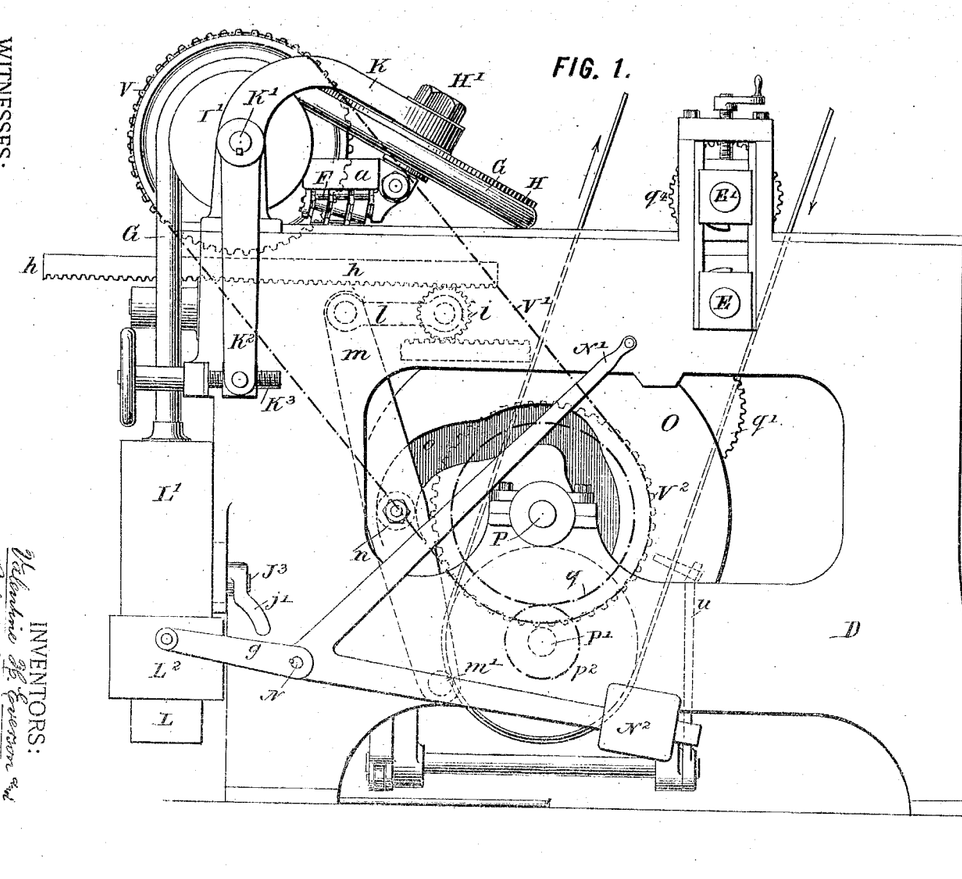
Figure 1 is a side elevation of our improved plate-printing press.
Figure 2:
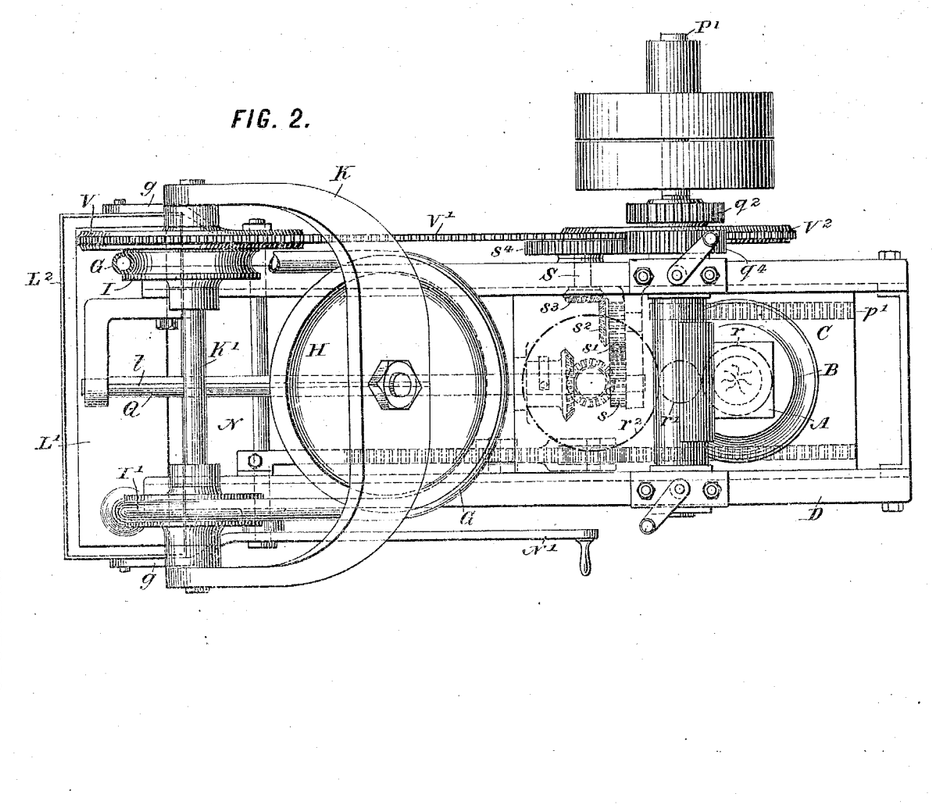
Fig. 2 is a plan thereof, showing it, however, in a different position.

In order that when the machine is stopped the wiper-belt shall not stand exposed to the action of the solvent, we provide for lowering the tank L sufficiently to bring the bath of solvent below the belt. To this end the tank L is hung on the ends of lever-arms g g, fastened on a cross-shaft N, as best shown in Figs. 1 and 2. This shaft is rocked by a hand-lever N', by which the machine is started or stopped, the movement for stopping the machine carrying the arms g g downward sufficiently to lower the tank L to the requisite distance. To prevent evaporation of the solvent, the bottom of the chamber L' is sealed in a trough L², extending around the tank L.

In order to stretch the wiper-belt, we make the axis of the pulley J movable up and down. In the construction shown its stud J' is mounted on a lever J², pivoted at one end to one side frame of the machine, and at its other end fastened to the other side frame through the medium of a screw-stud J³, passing through a slot j in the frame, and tightened by a handle j'. By setting the free end of the lever higher or lower the pulley J may be raised or lowered in order to stretch the wiper-belt to the desired extent.

The plate-table B revolves as described during the time that the plate is being inked and wiped. As soon as the belt passes beyond the wiper the table ceases to revolve, and the sliding bed C comes to a standstill, leaving the plate stationary and in position between the wiper and the impression-rolls E E'. In this position the operator lays on the card or sheet to be printed upon, the bed remaining stationary long enough to permit of this operation. The bed then resumes its forward movement and carries the plate between the impression-rolls E E', whereby the impression is printed. Upon completing the impression the bed moves back to the position where the card or sheet was laid on and again stops, whereupon the operator removes the printed card or sheet. As the bed thus moves back, the rolls E E' continue to revolve forward but do not come in contact with the bed, since they are cut away on the portions of their peripheries which turn in proximity to the bed during this rearward movement. After a sufficient dwell to enable the printed card or sheet to be removed, the bed continues its rearward movement, passing again under the wiper and then under the inking device, whereby the plate is again inked, and the described operations are repeated.

The mechanism for imparting the described movements to the bed and plate-holding table may be greatly varied, and the specific mechanism shown forms no necessary part of our invention. We will describe this mechanism.

Figure 4:
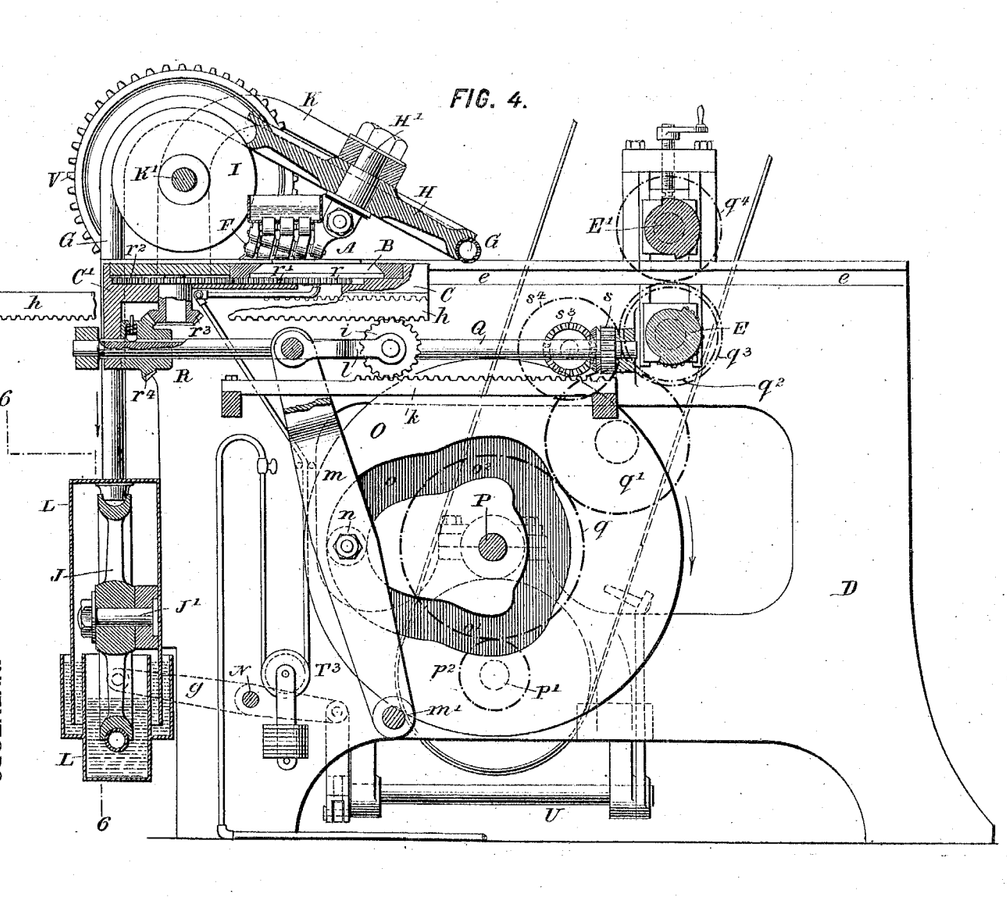
Fig. 4 is a vertical longitudinal section, being partly a mid-section and partly a section in the plane of the line 4 4 in Fig. 3.

Attached to the under side of the bed C is a toothed rack h, with which meshes a pinion i, which also meshes with a rack k, fixed to the frame D. The pinion i is journaled in a forked link $l$, which is pivoted to the forked end of a lever $m$, the lower end of which is pivoted to the frame at $m'$, and which carries at about its middle an antifriction roller $n$, which travels in a sinuous groove $o$, formed in a cam-disk O. This cam-disk is fixed on a continuously-revolving shaft P, and turns in the direction of the arrow in Fig. 4. Its cam-groove $o$ imparts a varying vibratory movement to the lever $m$, thereby driving the pinion $i$ back and forth against the fixed rack $k$, and by its rotation thereagainst communicating its movement, but doubled in speed and extent, to the rack $h$, and consequently to the bed C. The cam O is shown in Fig. 4 in the position occupied when the reciprocating bed is at its extreme back stroke in the inking position of the table. The cam-groove is formed with two periods of dwell $o'$ $o^2$, the first of which insures the stoppage of the bed in the position for applying the sheet or card to be printed, while the second stops the bed on the return stroke in the position for the removal of the printed sheet. To insure the exact coincidence and speed of the bed and the impression-rollers E E', the roller E is formed with a segmental pinion or row of cog-teeth $p$, engaging with a segmental rack $p'$, carried on the under side of the bed. The teeth $p$ engage the rack $p'$ during the forward or printing stroke of the bed and disengage therefrom upon the termination of its stroke, so that during the return stroke the bed is driven wholly by the action of the cam O.

The rollers E E' are driven from the shaft P through the medium of a gear $q$, Fig. 4, fixed on that shaft, an idler $q'$ and gear $q^2$, fixed on the shaft of the roll E. This roll carries a gear $q^3$, which meshes with a gear $q^4$ on the shaft of the roll E'. The shaft P is driven from an initial driving-shaft P', carrying fast and loose pulleys, and having a pinion $p^2$ meshing with the gear $q$.

Figure 5:
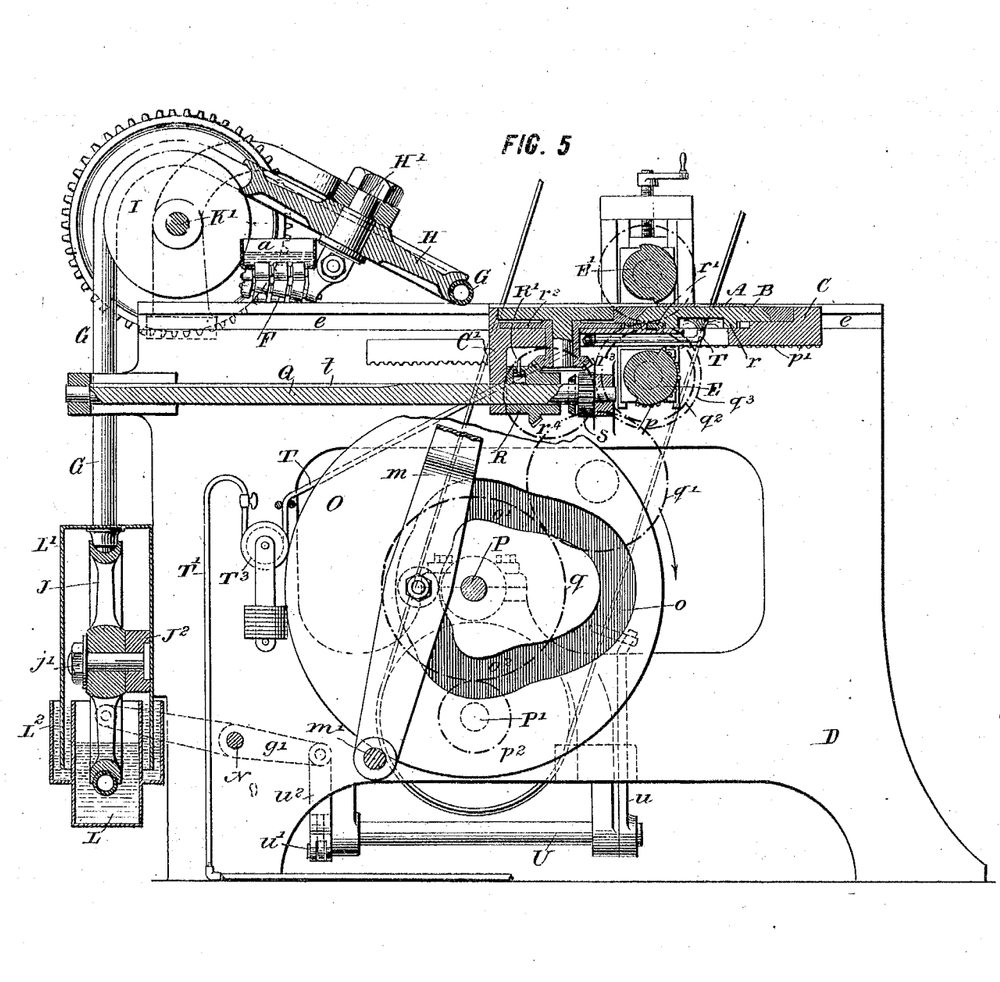
Fig. 5 is a section in similar planes, showing the printing-bed at the opposite extremity of its stroke.

The rotation of the plate-table B is effected in the following manner: This table is mounted in an undercut circular chamber formed in the bed C, so that it is capable of rotation. Beneath it is fastened an annular gear $r$, meshing with an idler-pinion $r'$, which meshes in turn with a gear $r^2$, these three gears being arranged flatwise within the bed C, as shown in Figs. 4 and 5, their pitch-lines being shown by dotted circles in Fig. 2. On the tubular hub of the gear $r^2$ is fixed or formed a bevel-gear $r^3$, meshing with a bevel-gear $r^4$, formed on a tubular sleeve or hub R, which is mounted to slide on a horizontal shaft Q, extending longitudinally beneath the bed and parallel with its direction of sliding movement. This shaft is driven with continuous rotary movement through the following train of gearing: On its end is fixed a pinion $s$, Fig. 5, meshing, as shown in Fig. 2, with a gear $s'$, to which is fixed a bevel-gear $s^2$, which is driven from a bevel-gear $s^3$, fixed on a short shaft S, having a bearing in the side frame, and on the outer end of which is fixed a gear-wheel $s^4$, Figs. 2 and 4, which is driven from the gear $q^3$ on the shaft of the roll E. The sleeve R, which is caused to slide on the shaft Q with the movement of the bed C by being carried therewith by a bracket-arm C' thereon, is part of the time engaged with the shaft Q so as to be rotated thereby, and the remainder of the time is disengaged therefrom. The shaft Q is provided with a longitudinal groove $t$, Fig. 5, extending from the rear of the machine for about two-thirds the length of the shaft and ending by a gentle incline terminating at the periphery of the shaft. The sleeve R is provided with a spring-seated key R', pressing against the shaft and adapted to enter the groove $t$. As the bed slides back and forth the sleeve R slides longitudinally along the shaft Q, its spring-key R' being engaged with the groove $t$ while the bed is in the inking and cleaning positions of the plate. As the bed reaches its stopping position, the key R' runs out of the groove $t$, so that the plate-table B, which up to this time has been rotated by being driven from the shaft Q, is freed from connection with this shaft, the shaft continuing to turn, but no longer driving the table. The table consequently ceases to rotate just as the bed C comes to rest in the position for laying on the sheet to be printed. When the bed again starts forward, the table B continues non-rotative during the printing and during the return stroke. It is not until the bed again starts back after the dwell for removing the printed sheet that the spring-key R' again encounters and drops into the groove $t$, whereby the rotation of the plate-table B is resumed.

For imparting the traveling movement to the wiper-belt G, any one or more of the pulleys by which it is carried may be geared to the driving mechanism, so as to cause it to rotate. As shown, the pulley I is thus driven, having fastened to it a sprocket-wheel V, Fig. 2, driven by a chain V' from a sprocket-wheel V², fixed on the shaft P.

To stop the machine, we provide a belt-shipper $u$, Fig. 3, keyed on a rock-shaft U, to which is fixed an arm $u'$, which is connected by a link $u^2$, Fig. 5, with an arm $g'$, keyed to the rock-shaft N, before described. This shaft is rocked, as before stated, by the hand-lever N' against the tension of a weight N². Fig. 1. This weight serves to keep the machine normally in operation by holding the belt on the fast pulley, but by moving the hand-lever to lift the weight the belt-shipper throws the belt onto the loose pulley and at the same time lowers the tank L of solvent, as before stated.

In order to provide for keeping the printing-plate heated to a suitable temperature, we make the plate-table B with a hollow chamber on its under side, and beneath this we arrange a gas-burner T, which is carried by the reciprocating bed C. Gas is admitted from the fixed pipe T' through a flexible tube T², which extends to the bed and communicates with the gas-pipe T. To keep this flexible tube stretched during the reciprocatory movements of the bed, its slack is taken up by being passed beneath a weighted pulley T³, which rises and falls as the bed moves back and forth.

Figure 9:
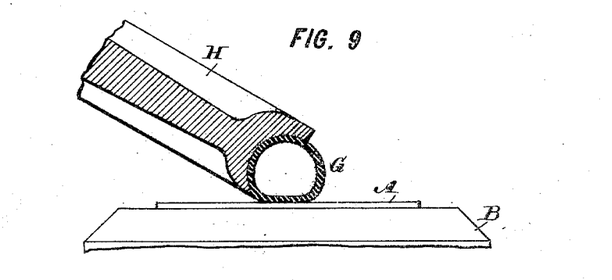
Fig. 9 is a fragmentary transverse section through the plate and wiper.

Fig. 9 illustrates the wiping action of the pneumatic wiping cushion or belt G. In operating against the plate it is flattened against the surface thereof, wiping across it with very much the same motion to that of the hand of a plate-printer in the operation of wiping or polishing the plate by hand. An important advantage of the construction of the wiper as an inflated cushion is that it admits of being thus flattened without pressing more heavily against one part of the plate than against another, so that all portions of the surface of the plate are wiped with the same pressure, thereby avoiding the liability of an insufficient wiping in one portion of the plate, and wiping under such heavy pressure at another portion as to drag the ink out of the lines. As the inflated cushion is flattened, the pressure of the air confined within it is distributed equally upon all portions of its surface in contact with the plate. Thus the exact degree of pressure of the wiper against the plate may be adjusted to a nicety not attainable by any of the means heretofore known.

Figure 10:
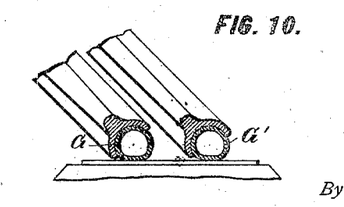
Fig. 10 is a similar view to Fig. 9, showing the duplication of the wiper.

The preferred material for the wiper is vulcanized india-rubber having a smooth, soft, and true surface. By this means it is believed that the plate can be so effectively wiped that no subsequent polishing will be necessary. If, however, in any instance it is required to polish the plate by a separate operation, we contemplate employing two wiper-belts, as shown at G and G' in Fig. 10. Of these the belt G will constitute the cleaner for removing the surplus ink from the plate, and the belt G' will constitute the polisher, and will be fed with whiting or other polishing-powder.

We claim as our invention the following-defined novel features, substantially as hereinbefore specified, namely:

1. In a plate-printing press, a wiper consisting of an endless tubular belt filled with a distending medium, combined with supports by which it is carried and presented to the plate.

2. In a plate-printing press, a wiper consisting of an endless rubber tube distended by inflation, combined with supports by which it is carried and presented to the plate.

3. In a plate-printing press, a wiper consisting of an endless tubular inflated belt combined with pulleys over which it is stretched and by the turning of which it may be propelled.

4. In a plate-printing press, a wiper consisting of an endless tubular inflated belt combined with pulleys over which it is stretched, and a driving mechanism for turning the pulleys to advance the belt and present clean wiper-surfaces to act against the plate.

5. In a plate-printing press the combination with a reciprocating plate-carrying bed, of a wiper consisting of an endless inflated belt, and a wiper-pulley over which said belt is carried and by which it is presented to the plate to wipe the plate as the latter reciprocates against it.

6. In a plate-printing press a wiper consisting of an endless inflated tubular belt, combined with pulleys carrying it, and a bath of solvent through which it passes to remove ink from it, and scrapers for cleansing the belt as it emerges from said bath.

7. In a plate-printing press, a wiper consisting of an endless inflated tubular belt combined with pulleys carrying it, a bath of solvent through which it passes, and a box or casing inclosing a space over said bath for preventing the spattering or evaporation of said bath, having close-fitting openings in its top through which the belt enters said casing on its way to the bath and emerges from said casing on its way from the bath.

8. In a plate-printing press, the combination of a wiper consisting of an endless inflated belt, a wiper-pulley over which said belt is carried and by which it is presented to the plate, and an adjustable frame for said pulley, by adjusting which the pulley may be set toward or from the plate to regulate the pressure of the wiper.

9. In a plate-printing press, the combination of a wiper-belt G, pulleys I I', J and H carrying it, a frame K for said pulley H pivoted on the axis of said pulleys I I', and means for adjusting said frame around said axis to regulate the degree of proximity of the wiper to the surface of the plate.

10. In a plate-printing press, the combination of a wiper consisting of an endless belt, pulleys carrying it, a tank of solvent into which said belt passes, movable up and down, and means for lowering said tank at will to drop the level of the solvent below the belt.

11. In a plate-printing press, the combination of a wiper consisting of an endless belt, pulleys carrying it, a tank of solvent into which said belt passes, movable up and down, a stationary casing above said tank inclosing the pulley around which the belt passes in said solvent, said tank movable up and down, and means for lowering it to bring the level of the solvent below the belt.

12. In a plate-printing press, the combination of revolving impression-rolls, an inking mechanism, and a wiper, with a reciprocating bed mounted to reciprocate beneath said inking mechanism and wiper, and between said rolls, a plate-carrying table mounted on said bed, and driving mechanism adapted to reciprocate said bed intermittently, moving it from the inking position past the wiper and stopping with the plate between the wiper and impression-rolls, again advancing to carry the plate between said rolls, moving back again to the same stopping position, stopping there again, and again moving the bed to the original starting position, and a driving mechanism for intermittently rotating said plate-table, adapted to rotate it while passing beneath the wiper and inking mechanism, and to be disconnected from it in the stopping position of the bed, and during the time that the bed is passing between the impression-rolls.

13. In a plate-printing press, the combination of a reciprocating bed and a rotative plate-carrying table mounted thereon, with an inking mechanism comprising a fountain, distributing-rollers and segmental conical inking-rollers, with their apexes turned toward the center of said table.

In witness whereof we have hereunto signed our names in the presence of two subscribing witnesses.

VALENTINE H. EVERSON.
ROBERT J. GOOD.

Witnesses:
H. C. SEAMAN,
DENNIS JUDGE.